United States Patent
Jeong et al.

(10) Patent No.: US 8,345,020 B2
(45) Date of Patent: Jan. 1, 2013

(54) TOUCH SCREEN PANEL

(75) Inventors: Hwan-Hee Jeong, Yongin (KR);
Tae-Hyeog Jung, Yongin (KR);
Sung-Ku Kang, Yongin (KR);
Jung-Mok Park, Yongin (KR);
Choon-Hyop Lee, Yongin (KR); Shawn Kim, Yongin (KR); Sang-Kook Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 525 days.

(21) Appl. No.: 12/591,157

(22) Filed: Nov. 10, 2009

(65) Prior Publication Data

US 2010/0182255 A1 Jul. 22, 2010

(30) Foreign Application Priority Data

Jan. 16, 2009 (KR) .................... 10-2009-0003642

(51) Int. Cl.
*G06F 3/045* (2006.01)
(52) U.S. Cl. .................... 345/174; 345/176; 178/18.06; 178/18.07
(58) Field of Classification Search .............. 345/89–98, 345/173–178, 204–215; 178/18.01–18.09, 178/20.01–20.04
See application file for complete search history.

(56) References Cited

U.S. PATENT DOCUMENTS

| | | | |
|---|---|---|---|
| 5,374,787 A | 12/1994 | Miller et al. | |
| 6,879,096 B1* | 4/2005 | Miyazaki et al. | 313/495 |
| 6,894,682 B2 | 5/2005 | Nakajima et al. | |
| 6,970,160 B2* | 11/2005 | Mulligan et al. | 345/173 |
| 7,339,579 B2 | 3/2008 | Richter et al. | |
| 7,864,503 B2* | 1/2011 | Chang | 361/288 |
| 2005/0084659 A1* | 4/2005 | Dunkel | 428/209 |
| 2006/0077153 A1* | 4/2006 | Cummings et al. | 345/85 |
| 2008/0122661 A1* | 5/2008 | Han | 341/22 |
| 2008/0264699 A1* | 10/2008 | Chang et al. | 178/18.01 |

FOREIGN PATENT DOCUMENTS

| | | |
|---|---|---|
| KR | 10-2002-0057247 | 7/2002 |
| KR | 10-2003-0061070 | 7/2003 |
| KR | 10-2004-0042486 | 5/2004 |
| KR | 1020040042486 A | 5/2004 |
| KR | 1020080049248 A | 6/2008 |
| KR | 1020080110477 A | 12/2008 |

OTHER PUBLICATIONS

Korean Office Action issued on Aug. 31, 2010 in the Korean patent application No. 10-2009-0003644 which corresponds to U.S. Appl. No. 12/591,159 and Request for Entry of the Accompanying Office Action herewith.

Korean Office Action issued by KIPO, dated Feb. 26, 2011, corresponding to Korean Patent Application No. 10-2009-0003644, together with Request for Entry.

* cited by examiner

*Primary Examiner* — Vijay Shankar
(74) *Attorney, Agent, or Firm* — Robert E. Bushnell, Esq.

(57) ABSTRACT

The touch screen panel of the present invention includes first sensing patterns formed on a transparent substrate, a first insulating film formed on the first sensing patterns, second sensing patterns formed on the first insulating film, a plurality of metal patterns disposed on edge regions of the first and second sensing patterns, and a plurality of auxiliary metal patterns formed in the same layer as the metal patterns. Each of the first and second sensing patterns has sensing cells and coupling lines. Each of the coupling lines connects two of the sensing cells. Each of the metal patterns is coupled to the first sensing pattern or to the second sensing pattern, and each of the auxiliary metal patterns being formed on one of the first coupling lines or on one of the second coupling lines.

9 Claims, 3 Drawing Sheets

TOUCH SCREEN PANEL

CLAIM OF PRIORITY

This application makes reference to, incorporates the same herein, and claims all benefits accruing under 35 U.S.C. §119 from an application earlier filed in the Korean Intellectual Property Office on 16 Jan. 2009 and there duly assigned Serial No. 10-2009-0003642.

BACKGROUND OF THE INVENTION

1. Field of the Invention

The present invention relates to a touch screen panel, and more particularly, to a touch screen panel that minimizes resistance of an intersection portion of first and second sensing patterns.

2. Description of the Related Art

A touch screen panel is an input device through which a user can input his or her instruction by selecting an instructed content displayed on a screen such as an image display device, etc. using a human's finger or an object.

To this end, the touch screen panel is provided on the front face of the image display device to convert a contact position, which the human's finger or object directly contacts, into an electrical signal. Therefore, the instructed content selected on the contact position is accepted as an input signal.

The touch screen panel as described above can replace an input device, e.g., a keyboard, a mouse, or the like to be coupled to the image display device to operate so that its applications are expanding widely.

As a method to implement the touch screen panel, a resistive type, a photosensitive type and an electrostatic capacity type have been known.

Among others, the electrostatic capacity type touch screen panel includes a conductive sensing pattern to sense change in electrostatic capacity formed in association with other sensing patterns in the vicinity thereof or a ground electrode, etc., thereby converting a contact position into an electrical signal.

Here, in order to clearly determine the contact position on the contact surface, the sensing pattern includes first sensing patterns (X patterns) formed to be coupled along a first direction, and second sensing patterns (Y patterns) formed to be coupled along a second direction.

The first and second sensing patterns as described above are generally positioned in the same layer. In this case, the sensing patterns positioned in the same X or Y lines are coupled by forming separate coupling patterns through contact holes formed in insulating films there.

Here, since the coupling patterns are made of the same material as the first and second sensing patterns, a mask process should be added in order to form the coupling patterns, thereby causing problems that the number of masks is increased and the process is complicated.

Also, if the first or second sensing patterns are electrically coupled through the separate coupling patterns, the first sensing pattern and the second sensing patterns are intersected with each other in regions where the coupling patterns are formed.

At this time, the width of the coupling pattern is generally minimized in order to reduce the effect of parasitic capacitance generated by the coupling pattern. When the coupling pattern has a narrow width, conversely, line resistance becomes high to have a disadvantage that sensing sensitivity is lowered.

SUMMARY OF THE INVENTION

It is an object of the present invention to provide a touch screen panel that removes a mask process for forming a separate coupling pattern by forming a first sensing pattern and a second sensing pattern in different layers, and by additionally forming an auxiliary metal patterns having the same material as metal patterns formed on an edge of the panel on an intersection part of the first and second sensing patterns, thereby preventing sensing sensitivity from being lowered by reducing the resistance of the intersection part.

In order to accomplish the above object, according to one aspect of the present invention, there is provided a touch screen panel including first sensing patterns that are formed on a transparent substrate, a first insulating film formed on the first sensing patterns, second sensing patterns formed on the first insulating film, a plurality of metal patterns disposed on edge regions of the first and second sensing patterns, and a plurality of auxiliary metal patterns formed in the same layer as the metal patterns. Each of the first sensing patterns includes a first sensing cell and a first coupling line. The first coupling line couples the first sensing cell to a first sensing cell of another of the first sensing patterns arranged in a first direction. Each of the second sensing patterns includes a second sensing cell and a second coupling line. The second coupling line couples the second sensing cell to a second sensing cell of another of the second sensing patterns arranged in a second direction. Each of the metal patterns is coupled to the first sensing pattern or to the second sensing pattern, and each of the auxiliary metal patterns is formed on one of the first coupling lines or on one of the second coupling lines.

The second sensing cells may be arranged alternately with the first sensing cells in order not to overlap with the first sensing cells.

The first and second sensing patterns are made of a transparent electrode material. Each of the first and the second sensing patterns may have a thickness of 100 to 300 angstroms. The transparent electrode material includes indium tin oxide (ITO). The metal patterns and the auxiliary metal patterns may be made of a material having a lower specific resistance than materials of the first and second sensing patterns.

With the present invention as describe above, the first sensing patterns coupled to each other along the first direction and the second sensing patterns coupled to each other along the second direction are disposed in different layers, making it possible to reduce the number of masks and to simplify the process. Also, substance made of the same material as the metal patterns formed on the edge of the panel is additionally formed on the intersection part of the first and second sensing patterns to reduce the resistance of the intersection part, making it possible to prevent sensing sensitivity from being lowered.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
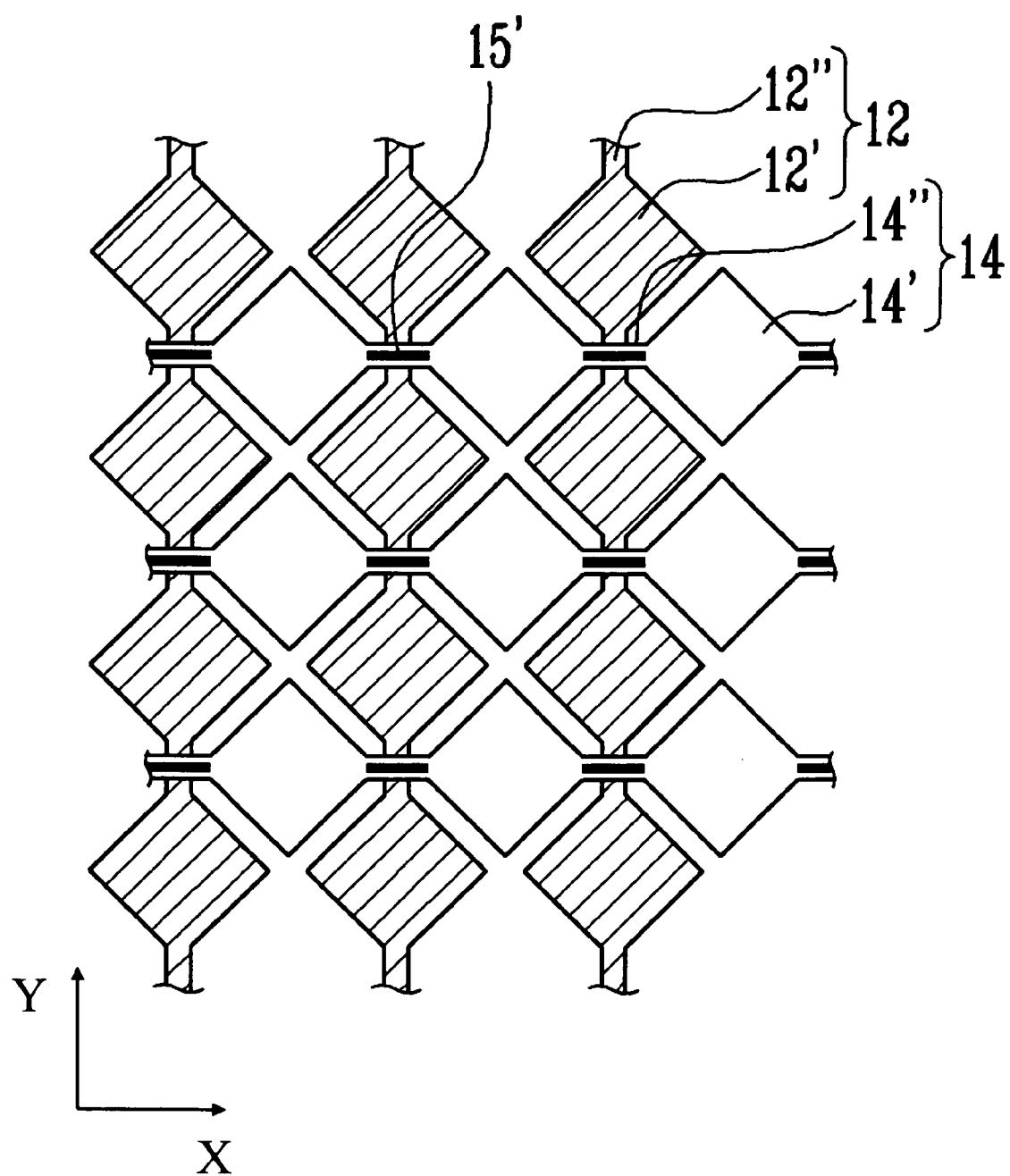
FIG. 1 is a plan view showing a disposition of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, exemplary embodiments according to the present invention will be described in more detail with reference to the accompanying drawings.

FIG. 1 is a plan view showing a disposition of sensing patterns according to an embodiment of the present invention.

Referring to FIG. 1, the sensing patterns according to the embodiment of the present invention include first sand second sensing patterns 12 and 14 that are alternately disposed. As shown in FIG. 1, each of the first sensing patterns 12 includes a first sensing cell 12' and a first coupling line 12", and each of the second sensing patterns 14 includes a second sensing cell 14' and a second coupling line 14". In the first sensing patterns 12, first sensing cells having the same X-coordinate are coupled to each other. In the second sensing patterns 14, second sensing cells having the same Y-coordinate are coupled to each other.

In other words, the first sensing patterns 12 includes arrays of first sensing cells 12', with each of the arrays of the first sensing cells 12' disposed along a first direction (along Y-axis), and first coupling lines 12", each of which couples adjacent first sensing cells 12' having the same X-coordinate. As shown in FIG. 1, the first sensing cells 12' having the same X-coordinate are arranged along Y-axis. The second sensing patterns 14 includes arrays of second sensing cells 14', with each of the arrays of the second sending cells 14' disposed along a second direction (along X-axis), and second coupling lines 12", each of which couples adjacent second sensing cells 14' having the same Y-coordinate. The second sensing cells 14' having the same Y-coordinate are arranged along X-axis.

However, in the present invention, the first sensing patterns 12 and the second sensing patterns 14 are disposed in different layers. For example, the first sensing patterns 12 may be positioned on a lower layer and the second sensing patterns 14 may be positioned on an upper layer. An insulating film may be positioned between the first and second sensing patterns.

As described above, if the first sensing patterns 12 and the second sensing patterns 14 are disposed in different layers, first sensing cells 12' arranged in the first direction can be coupled to each other by simultaneously forming the first coupling lines 12" while pattering the first sensing cells 12'. The second sensing cells 14' arranged in the second direction can be coupled to each other by simultaneously forming the second coupling lines 14" while patterning the second sensing cells 14'.

Therefore, a process of forming separate contact holes and coupling patterns can be omitted, thereby making it possible to reduce the number of masks and to simplify the process.

However, in this case, the first coupling lines 12" of the first sensing patterns 12 and the second coupling lines 14" of the second sensing patterns 14 intersect with each other. It is preferable that the width of the first and second coupling lines 12" and 14" is minimized in order to reduce the effect of parasitic capacitance generated in the intersection of the first and second coupling lines.

However, when the width of the first and second coupling lines 12" and 14" is minimized as described above, line resistance of each of the first sensing patterns 12 and the second sensing patterns 14 becomes high, consequently causing a problem that sensing sensitivity that implements the function of the touch screen panel is lowered.

In order to solve the problem, the embodiment of the present invention further includes auxiliary metal patterns 15' that have a lower resistance than any one of the first and second coupling lines 12" and 14". For example, the material of the auxiliary metal patterns 15' may have a lower specific resistance (or resistivity) than the materials of the first and second sensing patterns 12 and 14 (materials of the first and second sensing cells and coupling lines).

At this time, the auxiliary metal patterns 15' may be made of the same material as metal patterns 15 (shown in FIG. 2) that are formed on edge regions of the first sensing patterns 12 and the second sensing patterns 14. The metal patterns 15 are formed to supply the sensed signals in the first and second sensing patterns 12 and 14 to a driving circuit (not shown). In other words, the auxiliary metal patterns 15' are formed in the same layer as the metal patterns so that an additional mask process is not required for forming the auxiliary metal patterns 15'.

Figure 2:
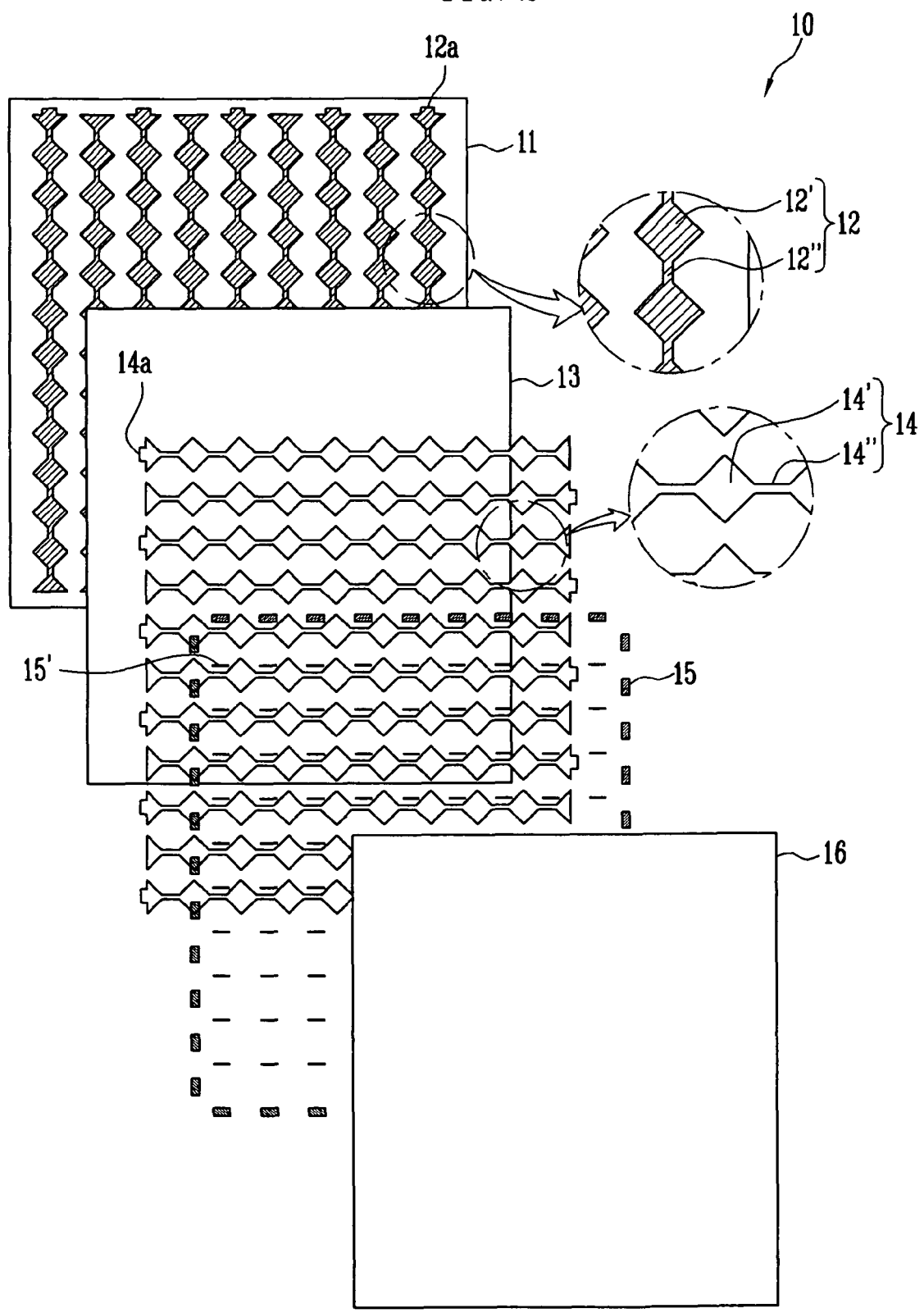
FIG. 2 is an exploded plan view of a touch screen panel according an embodiment of the present invention.
Figure 3:
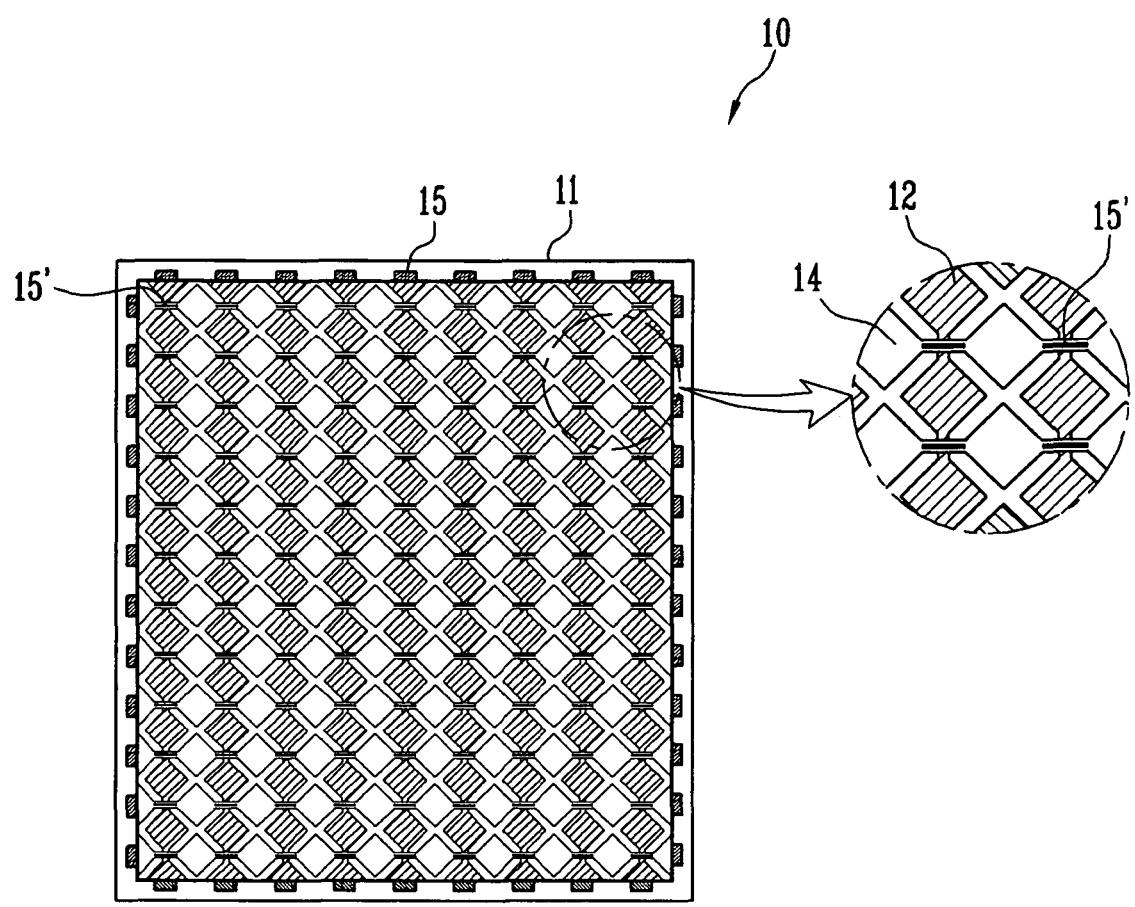
FIG. 3 is a combined plan view of the touch screen panels of FIG. 2.

FIG. 2 is an exploded plan view of a touch screen panel according an embodiment of the present invention, and FIG. 3 is a combined plan view of the touch screen panels of FIG. 2.

Referring to FIGS. 2 and 3, the touch screen panel 10 according to the embodiment of the present invention includes a transparent substrate 11, and first sensing patterns 12, a first insulating film 13, second sensing patterns 14, metal patterns 15 and a second insulating film 16 that are formed sequentially on the transparent substrate 11.

Also, the touch screen panel 10 according to the embodiment of the present invention further includes auxiliary metal patterns 15' formed on the first coupling lines 12" of the first sensing patterns 12 or on the second coupling lines 14" of the second sensing patterns 14.

The first sensing patterns 12 are formed on one surface of the transparent substrate 11 with first sensing cells 12' to be coupled to each other along a first direction. For example, the first sensing patterns 12 may be formed on the upper surface of the transparent substrate 11, wherein the first sensing cells 12' having a regular shape such as a diamond shape are arranged on the upper surface of the transparent substrate 10.

In other words, the first sensing patterns 12 include first sensing cells 12' disposed along a first direction and first coupling lines 12" that couple adjacent first sensing cells 12' having the same X-coordinate. Here, the shape of the first sensing cells 12' is not limited to the diamond shape, but the first sensing cells 12' may have various shapes as long as the first sensing cells 12' can be arranged close to each other.

The first sensing patterns 12 include first pads 12a that are electrically coupled to some of the metal patterns 15 arranged along X-axis. The pads 12a of the first sensing patterns 12 may be alternately provided on the upper side or on the lower side of the first sensing patterns 12 as shown in FIG. 2, may be positioned only on the upper side or on the lower side of the first sensing patterns 12, or may be positioned on both the upper and lower sides of the first sensing patterns 12.

Also, the first insulating film 13 is formed on the first sensing patterns 12, and the second sensing patterns 14 are formed on the first insulating film 13. The second sensing cells 14' are arranged on the first insulating film 13 alternately with the first sensing cells 12' in order not to overlap with the first sensing cells 12'.

In other words, the second sensing patterns 14 include second sensing cells 14' disposed along a second direction and second coupling lines 14" that couple adjacent second sensing cells 14' having the same Y-coordinates. The second sensing cells 14' are arranged to be close to each other, and each of the second sensing cells 14' has the same diamond shape as the first sensing cells 12'.

The second sensing patterns 14 have second pads 14a that can be electrically coupled to some of the metal patterns 15 arranged along Y-axis. The second pads 14a of the second sensing patterns 14 may be alternately provided on the left side or the right side of the second sensing patterns 14, may be positioned only on the left side or on the right side of the second sensing patterns 14, or may be positioned on both the left and right sides of the second sensing patterns 14.

At this time, the first sensing cells 12' are not formed on the regions on which the second sensing cells 14' are formed. However, the first coupling line 12" that couples the first sensing cells 12' partially overlap with the second coupling line 14" that couples the second sensing cells 14'. In other words, the first sensing cells 12' and the second sensing cells 14' are disposed alternately in order to cross each other.

Meanwhile, the first and second sensing patterns 12 and 14 and the first insulating film 13 are made of a transparent material so that light emitted from a display panel (not shown), etc. disposed in the lower portion of the touch screen panel 10 can be transmitted into the touch screen panel 10. In other words, the sensing cells and lines of the first and second sensing patterns 12 and 14 can be made of a transparent electrode material such as indium tin oxide (hereinafter, referred to as ITO), and the first insulating film 13 is made of transparent insulating material.

The thickness thereof can be set in the range that the touch screen panel 10 (in particular, the first and second sensing patterns 12 and 14) can have a relatively low surface resistance, securing the transmittance of the light coming from the display panel. In other words, the thickness of the first and second sensing patterns 12 and 14 and the first insulating film 13 can be set to be optimized in consideration of the transmittance of light and the surface resistance.

For example, the sensing cells and lines of the first and second sensing patterns 12 and 14 may be formed of an indium tin oxide (hereinafter, referred to as ITO) pattern having a thickness of 100 to 300 angstroms (Å), respectively, and the first insulating film 13 may be made of a transparent insulating material having a thickness of 400 to 1000 angstroms (Å) (in particular, a thickness of 400 to 700 angstroms (Å)). Optical refractive index of the first insulating film 13 can be in the range of 1.6 to 1.9. However, this is merely one example and the present invention is not limited thereto. Therefore, the thickness thereof may also be changed in consideration of the transmittance and/or the surface resistance, etc.

The metal patterns 15 are disposed on edge regions of the first and second sensing patterns 12 and 14, in particular, on regions corresponding to the first and second pads 12a and 14a of the first and second sensing patterns 12 and 14. The metal patterns 15 as described above electrically couples the sensing patterns 12 and 14 in one row unit or in one column unit to position detecting lines (not shown), respectively, to allow contact position detecting signals to be supplied to a driving circuit (not shown), etc.

The second insulating film 16 is formed on the second sensing patterns 14 and the metal patterns 15 to cover them.

For example, the second insulating film 16 may be formed on the second sensing patterns 14 and the metal patterns 15, and may be made of transparent insulating material having a thickness of 400 to 1000 angstroms (Å). However, the second insulating film 16 may be omitted depending on the design of a product.

However, in the structure as described above, the first coupling line 12" of the first sensing patterns 12 and the second coupling line 14" of the second sensing patterns 14 are formed to be intersected with each other. Thereby, parasitic capacitance is generated in the overlapping region due to the intersection of the first and second coupling lines and this becomes a great obstacle in outputting sensing signals.

In order to overcome this, it is preferable that the width of the first and second coupling lines 12" and 14" is minimized. However, when the width of the first and second coupling lines 12" and 14" is minimized, line resistance of each of the first sensing patters 12 and the second sensing patterns 14 becomes high, consequently causing a problem that sensing sensitivity that implements the function of the touch screen panel is lowered.

In particular, a transparent conductive material that implements the first and second sensing patterns 12 and 14, such as ITO, have a higher resistance value so that the increase in the line resistance that is generated when the width of the coupling line is reduced have a great influence on the lowering of the sensing sensitivity.

In order to overcome the problem, the embodiment of the present invention is characterized by further comprising auxiliary metal patterns 15' that have a lower resistance than any one line of the first and second coupling lines 12" and 14". At this time, the auxiliary metal patterns 15' may be made of the same material as the metal patterns 15.

In the embodiment shown in FIGS. 2 and 3, the second sensing patterns 14 are formed on the first sensing patterns 12, and the metal patterns 15 are formed on the second sensing patterns 14 so that the auxiliary metal patterns 15 are formed on the second coupling lines 14" of the second sensing patterns 14.

As described above, since the auxiliary metal patterns 15' are formed on the second coupling lines 14", the entire resistance value of the second coupling lines 14" becomes lower. Therefore, although the line width of the first and second coupling lines 12" and 14" is reduced in order to reduce parasitic capacitance, it is possible to prevent the line resistance from being increased.

Further, the auxiliary metal patterns 15' are additionally formed on the second coupling lines 14", making it possible to be stronger against the damage generated when external static electricity is flowed in.

Also, the auxiliary metal patterns 15' are formed in the same layer as the metal patterns 15 through the same process so that an additional mask process is not required for forming the auxiliary metal patterns 15'.

If the touch screen panel 10 is touched by a human's finger or an object in a state where the respective constituents of the touch screen panel 10 as described above are combined as shown in FIG. 3, a change in electrostatic capacity in accordance with the contact position is transferred to the driving circuit side, via the first and second sensing patterns 12 and 14, the metal patterns 15 and the position detecting lines coupled to the metal patterns 15. The change in electrostatic capacity is converted into an electrical signal by the X and Y input processing circuits (not shown), etc. so that the contact position is comprehended.

With the touch screen panel 10 of the present invention as described above, the first sensing patterns 12 coupled to each other along the first direction and the second sensing patterns 14 coupled to each other along the second direction are disposed in different layers, making it possible to reduce the number of masks and to simplify the process.

Meanwhile, a transparent ground electrode (not shown) and a third insulating film (not shown) that covers the transparent ground electrode may further be formed on the other surface opposite to one surface of the transparent substrate 11 on which the first and second sensing patterns 12 and 14 are formed, that is, on the lower surface of the transparent substrate 11.

For example, the transparent ground electrode made of a transparent electrode material such as ITO, etc. having a thickness of 100 to 300 angstroms (Å) may be formed on the lower surface of the transparent substrate 11, and the third insulating film that covers the transparent ground electrode, having a thickness of 400 to 1000 angstroms (Å), may be formed on the lower portion of the transparent ground electrode.

However, this is merely one embodiment but the thickness of the transparent ground electrode and the third insulating film may be modified in consideration of the light transmittance, etc. Also, the transparent ground electrode and/or the third insulating film may also be omitted according to the design of a product.

The transparent ground electrode may be used in securing stability between the touch screen panel 10 and the display panel, etc., and may also be used in forming the first and second sensing patterns 12 and 14 and the electrostatic capacity according to the design method of the touch screen panel 10.

In other words, in the electrostatic capacity type touch screen panel 10, in order to sense the contact position, the electrostatic capacity between the first sensing pattern 12 and the second sensing pattern 14 may be used, or the electrostatic capacity between the first and second sensing patterns 12 and 14 and the transparent ground electrode may be used, wherein this may be variously modified.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
    a transparent substrate;
    first sensing patterns formed on the transparent substrate, each of the first sensing pattern comprising:
        a first sensing cell; and
        a first coupling line coupling the first sensing cell to a first sensing cell of another of the first sensing patterns arranged in a first direction;
    a first insulating film formed on the first sensing pattern;
    second sensing patterns formed on the first insulating film, each of the second sensing pattern comprising:
        a second sensing cell; and
        a second coupling line coupling the second sensing cell to a second sensing cell of another of the second sensing patterns arranged in a second direction;
    a plurality of metal patterns disposed on edge regions of the first and second sensing patterns, each of the metal patterns being coupled to the first sensing patterns or to the second sensing patterns; and
    a plurality of auxiliary metal patterns formed in the same layer as the metal patterns, each of the auxiliary metal patterns being formed on the first coupling line or on the second coupling line, the auxiliary metal patterns being made of a material having a lower specific resistance than materials of the first and second sensing patterns.

2. The touch screen panel as claimed in claim 1, wherein the second sensing cells are arranged alternately with the first sensing cells in order not to overlap with the first sensing cells.

3. The touch screen panel as claimed in claim 1, wherein the first and second sensing patterns are made of a transparent electrode material, each of the first and the second sensing patterns having a thickness of 100 angstroms to 300 angstroms.

4. The touch screen panel as claimed in claim 1, wherein the metal patterns are made of the same material as the auxiliary metal patterns.

5. A touch screen panel, comprising:
    a transparent substrate;
    first sensing patterns formed on the transparent substrate, each of the first sensing pattern comprising:
        a first sensing cell; and
        a first coupling line coupling the first sensing cell to a first sensing cell of another of the first sensing patterns arranged in a first direction;
    a first insulating film formed on the first sensing pattern;
    second sensing patterns formed on the first insulating film, each of the second sensing pattern comprising:
        a second sensing cell; and
        a second coupling line coupling the second sensing cell to a second sensing cell of another of the second sensing patterns arranged in a second direction;
    a plurality of metal patterns disposed on edge regions of the first and second sensing patterns, each of the metal patterns being coupled to the first sensing patterns or to the second sensing patterns; and
    a plurality of auxiliary metal patterns formed in the same layer as the metal patterns, each of the auxiliary metal patterns being formed on the first coupling line or on the second coupling line.

6. The touch screen panel as claimed in claim 1, wherein the second sensing cells are arranged alternately with the first sensing cells in order not to overlap with the first sensing cells.

7. The touch screen panel as claimed in claim 1, wherein the first and second sensing patterns are made of a transparent electrode material, each of the first and the second sensing patterns having a thickness of 100 angstroms to 300 angstroms.

8. The touch screen panel as claimed in claim 7, wherein the transparent electrode material includes indium tin oxide (ITO).

9. The touch screen panel as claimed in claim 1, wherein the metal patterns and the auxiliary metal patterns are made of a material having a lower specific resistance than materials of the first and second sensing patterns.

* * * * *